(12) United States Patent
Chu et al.

(10) Patent No.: US 8,581,987 B1
(45) Date of Patent: Nov. 12, 2013

(54) SYSTEMS AND METHODS FOR EVALUATING VIDEO QUALITY

(75) Inventors: Bei Chu, Shanghai (CN); Daoning Shen, Shanghai (CN)

(73) Assignee: Marvell International Ltd., Hamilton (BM)

( * ) Notice: Subject to any disclaimer, the term of this patent is extended or adjusted under 35 U.S.C. 154(b) by 78 days.

(21) Appl. No.: 13/408,180

(22) Filed: Feb. 29, 2012

Related U.S. Application Data

(60) Provisional application No. 61/454,900, filed on Mar. 21, 2011.

(51) Int. Cl.
*H04N 17/00* (2006.01)

(52) U.S. Cl.
USPC .......................................................... 348/193

(58) Field of Classification Search
USPC ......... 348/193, 180, 181, 184, 185, 187, 188, 348/189–192
See application file for complete search history.

(56) References Cited

U.S. PATENT DOCUMENTS

| | | | |
|---|---|---|---|
| 5,818,520 A * | 10/1998 | Janko et al. ................... | 348/192 |
| 5,940,124 A * | 8/1999 | Janko et al. ................... | 348/189 |
| 6,246,435 B1 * | 6/2001 | Patel .............................. | 348/192 |
| 6,493,023 B1 * | 12/2002 | Watson .......................... | 348/180 |
| 6,992,697 B2 * | 1/2006 | Ali .................................. | 348/189 |
| 7,385,627 B2 * | 6/2008 | Sugimoto et al. ............. | 348/192 |
| 7,705,881 B2 * | 4/2010 | Okamoto et al. .............. | 348/180 |
| 7,733,372 B2 * | 6/2010 | Ong et al. ...................... | 348/180 |
| 7,916,173 B2 * | 3/2011 | Clark et al. .................... | 348/180 |
| 8,253,803 B2 * | 8/2012 | Okamoto et al. .............. | 348/180 |
| 8,284,259 B2 * | 10/2012 | Karacali-Akyamac ....... | 348/180 |
| 2003/0086001 A1 * | 5/2003 | Zeidler .......................... | 348/183 |
| 2004/0114685 A1 * | 6/2004 | Kouloheris et al. ...... | 375/240.03 |
| 2012/0120251 A1 * | 5/2012 | Sun et al. ....................... | 348/180 |
| 2012/0212624 A1 * | 8/2012 | Yang et al. ..................... | 348/180 |

* cited by examiner

*Primary Examiner* — Paulos M Natnael

(57) ABSTRACT

System and methods are provided for evaluating quality of a video sequence. For example, a video sequence including one or more image frames is received, the video sequence being associated with a video processing system. A frame quality factor for each image frame in the video sequence is generated based on a comparison between the image frame and a reference image frame. A fluctuation value and a weight value of the image frames are generated, the fluctuation value of the image frames indicating a variation of the frame quality factors of the image frames, the weight value of the image frames being determined based on an average of the frame quality factors of the image frames. A video quality factor is output based on the frame quality factors of the image frames, the fluctuation value of the image frames, and the weight value of the image frames.

20 Claims, 4 Drawing Sheets

SYSTEMS AND METHODS FOR EVALUATING VIDEO QUALITY

CROSS-REFERENCE TO RELATED APPLICATIONS

This application claims priority to and benefit from U.S. Provisional Patent Application No. 61/454,900, filed on Mar. 21, 2011, and entitled "Video sequence quality stability judgment algorithm-weighted fluctuation algorithm," the entirety of which is incorporated herein by reference.

FIELD

The technology described in this patent document relates generally to image quality evaluation.

BACKGROUND

A wide range of devices, including mobile phones, digital cameras, and digital camcorders, can create, store, or transmit video sequences (i.e., video clips). Evaluation of the quality of video sequences is often important for evaluating transmission quality of a device, verifying performance of a video encoder, and developing new video coding techniques.

SUMMARY

In accordance with the teachings described herein, systems and methods are provided for evaluating quality of a video sequence. In one embodiment, a video sequence including one or more image frames is received, the video sequence being associated with a video processing system. A frame quality factor for each image frame in the video sequence is generated based on a comparison between the image frame and a reference image frame. A fluctuation value and a weight value of the image frames are generated, the fluctuation value of the image frames indicating a variation of the frame quality factors of the image frames, the weight value of the image frames being determined based on an average of the frame quality factors of the image frames. A video quality factor is output based on the frame quality factors of the image frames, the fluctuation value of the image frames, and the weight value of the image frames.

In another embodiment, a system for evaluating quality of a video sequence includes one or more data processors, and a computer-readable storage medium encoded with instructions for commanding the one or more data processors to execute steps. The steps include receiving a video sequence including one or more image frames, the video sequence being associated with a video processing system, and generating a frame quality factor for each image frame in the video sequence based on a comparison between the image frame and a reference image frame. The steps further include generating a fluctuation value and a weight value of the image frames, the fluctuation value of the image frames indicating a variation of the frame quality factors of the image frames, the weight value of the image frames being determined based on an average of the frame quality factors of the image frames, and outputting, using the data processor, a video quality factor based on the frame quality factors of the image frames, the fluctuation value of the image frames, and the weight value of the image frames.

In yet another embodiment, a non-transitory computer-readable storage medium comprises programming instructions for evaluating quality of a video sequence, the programming instructions being adapted to cause a processing system to execute steps. The steps include receiving a video sequence including one or more image frames, the video sequence being associated with a video processing system, and generating a frame quality factor for each image frame in the video sequence based on a comparison between the image frame and a reference image frame. The steps further include generating a fluctuation value and a weight value of the image frames, the fluctuation value of the image frames indicating a variation of the frame quality factors of the image frames, the weight value of the image frames being determined based on an average of the frame quality factors of the image frames, and outputting a video quality factor based on the frame quality factors of the image frames, the fluctuation value of the image frames, and the weight value of the image frames.

DETAILED DESCRIPTION

A video sequence (i.e., a video clip) includes a number of image frames. Various approaches have been developed to evaluate the quality of a video sequence by evaluating the quality of image frames in the video sequence. For example, the quality of each image frame in a video sequence can be represented using a peak-signal-to-noise ratio (PSNR) or a structural-similarity-based-image-quality assessment (SSIM) index. Visual quality of the entire video sequence is then represented by calculating an average value of PSNRs or SSIM indices of the image frames in the video sequence. Such representation, however, often does not accurately reflect how a human observer perceives the video sequence because it fails to take into account quality fluctuation of the image frames in the video sequence that can affect human perception.

For example, considering two video sequences each contain a same number of image frames and have a same average value of PSNRs for the image frames, one video sequence has little fluctuation of image frame quality, while the other video sequence contains some good quality image frames and some poor quality image frames. In this situation, a human observer may determine that the video sequence with little frame quality fluctuation has a much better quality than the video sequence which includes several poor quality image frames.

Figure 1:
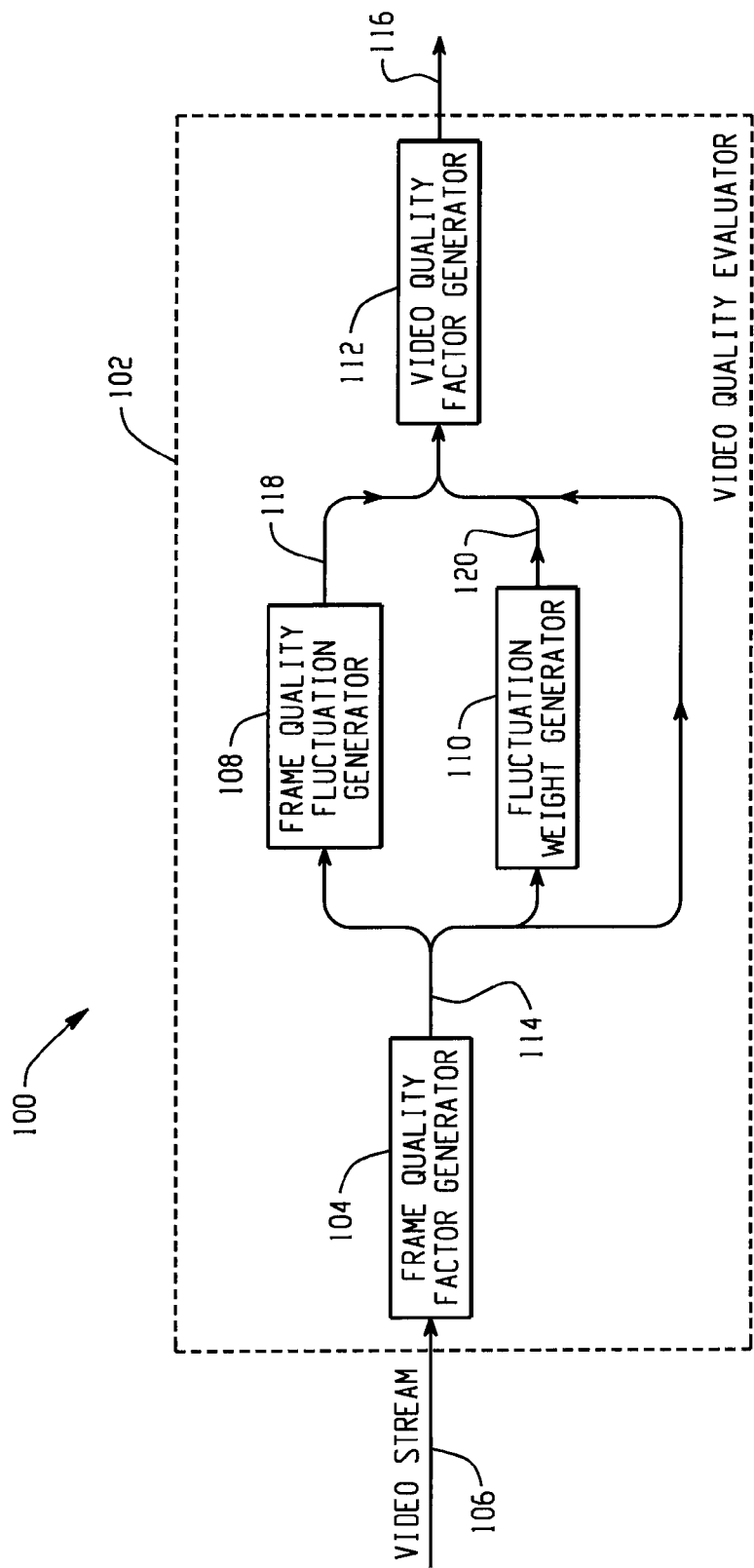
FIG. 1 illustrates an example system for evaluating quality of video sequences with consideration of frame quality fluctuation.

FIG. 1 illustrates an example system 100 for evaluating quality of video sequences with consideration of frame quality fluctuation. A video quality evaluator 102 receives a video sequence 106 that includes one or more image frames and outputs a video quality factor 116 to indicate the overall quality of the video sequence 106.

Specifically, the video quality evaluator 102 includes a frame quality factor generator 104, a frame quality fluctuation generator 108, a fluctuation weight generator 110, and a video quality factor generator 112. The frame quality factor generator 104 receives the video sequence 106 and outputs frame quality factors 114 for image frames contained in the video sequence 106. The frame quality fluctuation generator 108 outputs a quality fluctuation factor 118 which represents quality fluctuation of the image frames in the video sequence 106. In addition, the fluctuation weight generator 110 outputs a fluctuation weight 120 that adjusts the impact of the quality fluctuation factor 118. The video quality factor generator 112 receives the frame quality factors 114, the quality fluctuation factor 118, and the fluctuation weight 120 and outputs the video quality factor 116 to indicate the overall quality of the video sequence 106.

Figure 2:
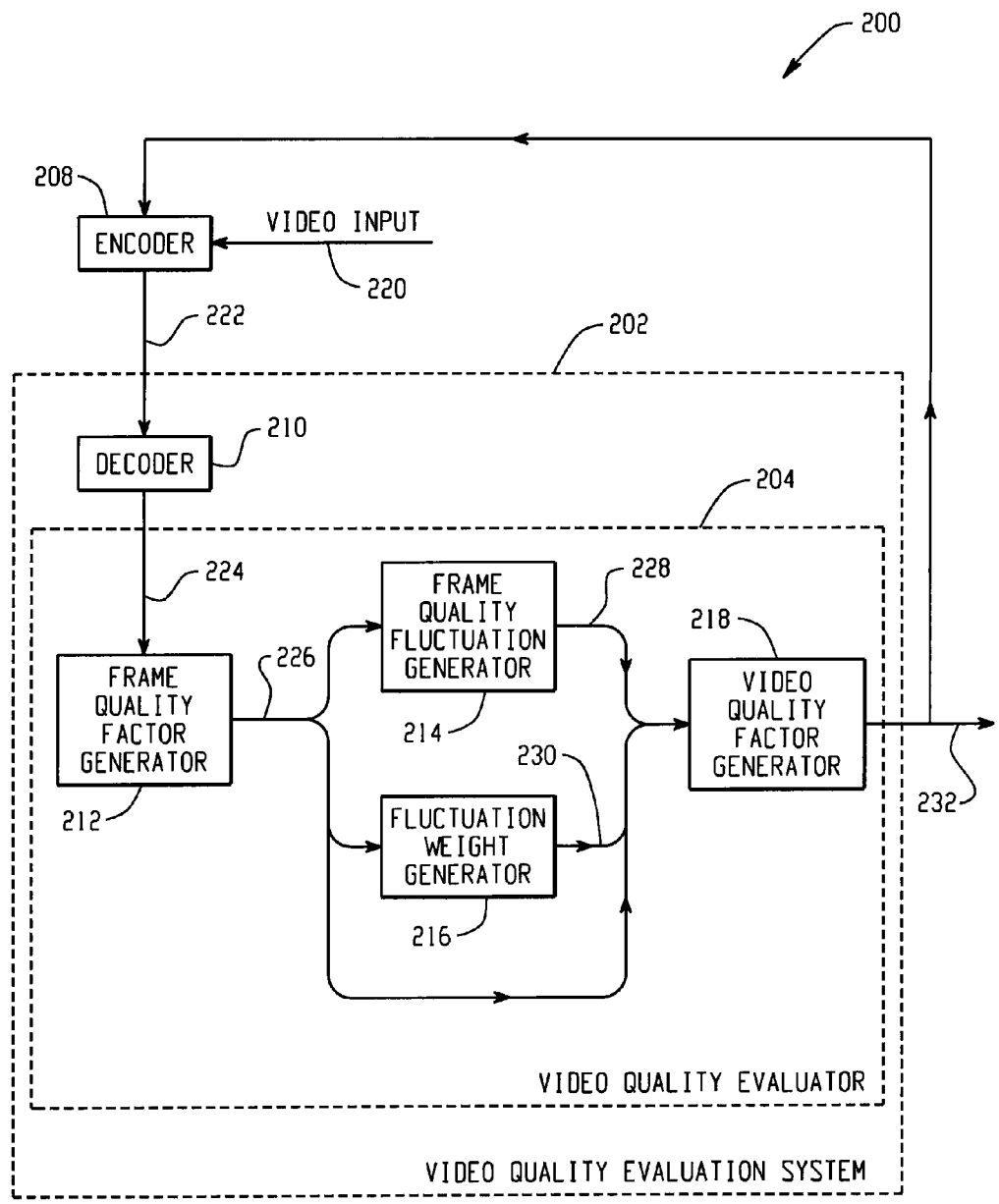
FIG. 2 illustrates an example system for video quality evaluation of an encoder.

If the video sequence 106 is related to output of a video processing system (e.g., an encoder), then the overall quality of the video sequence 106 indicates the quality of the video processing system to some extent. Parameters of the video processing system or algorithms used by the video processing system may need to be adjusted if the overall quality of the video sequence 106 is not acceptable. FIG. 2 illustrates an example system 200 for video quality evaluation of an encoder.

As shown in FIG. 2, a video quality evaluation system 202 receives and evaluates a video stream 222 from an encoder 208 that processes raw video data 220. The video quality evaluation system 202 includes a decoder 210 that transforms the video stream 222 into a video sequence 224 and a video quality evaluator 204 that outputs a video quality factor 232 for the video sequence 224.

Particularly, the video quality evaluator 204 includes a frame quality factor generator 212, a frame quality fluctuation generator 214, a fluctuation weight generator 216 and a video quality factor generator 218. The frame quality factor generator 212 generates frame quality factors 226 for image frames in the video sequence 224 which are received by the video quality factor generator 218. In addition, the video quality factor generator 218 receives a quality fluctuation factor 228 from the frame quality fluctuation generator 214 and a fluctuation weight 230 from the fluctuation weight generator 216 to generate a video quality factor 232. The video quality factor 232 that indicates the overall quality of the video sequence 224 may be fed back to the encoder 208 for quality evaluation. For example, if the video quality factor 232 is lower than a threshold value, the quality of the video sequence 224 is not acceptable, and a coding algorithm (e.g., a bit rate control algorithm) implemented by the encoder 208 can be replaced or improved according to the video quality factor 232.

Each of the frame quality factors 226 may include a peak-signal-to-noise ratio (PSNR) value or a structural-similarity-based-image-quality assessment (SSIM) index. The quality fluctuation factor 228, the fluctuation weight 230, and the video quality factor 232 can be determined using PSNR values or SSIM indices for the image frames in the video sequence 224.

A PSNR value of an image frame may be determined according to the following equation:

$$PSNR = 10 \times \log_{10} \frac{\text{MaxErr}^2 \times w \times h}{\sum_{i=0,j=0}^{w,h}(x_{ij} - y_{ij})^2} \quad \text{(Equation 1)}$$

where $x_{ij}$ represents a pixel value of a location (i, j) in the image frame, $y_{ij}$ represents a pixel value of the location (i, j) in a reference frame, MaxErr represents a maximum difference of pixel values between the image frame and the reference frame, w represents a width of the image frame, and h represents a height of the image frame.

An average PSNR value of the image frames may be determined according to the following equation:

$$PSNR_{average} = \frac{1}{N} \times \sum_{n=0}^{N} PSNR_n \quad \text{(Equation 2)}$$

where $PSNR_n$ represents a PSNR value of an image frame contained in the video sequence and N represents the number of image frames contained in the video sequence.

The quality fluctuation factor 228 may be represented using the PSNR values of the image frames according to the following equation:

$$P_{fluctuation} = \sqrt{\frac{\sum_{i=0}^{N}(PSNR_i - PSNR_{average})^2}{N}} \quad \text{(Equation 3)}$$

where $PSNR_{average}$ represents the average PSNR value of the image frames, $PSNR_i$ represents a PSNR value of an image frame, and N represents the number of image frames contained in the video sequence.

The fluctuation weight 230 is used to adjust the impact of the quality fluctuation factor 228 and may be calculated using various algorithms. The fluctuation weight 230 may be determined based on the average PSNR value of the image frames as follows:

$$W = \begin{cases} 0.5 & PSNR_{average} \leq 16 \\ \frac{1}{40} \times PSNR_{average} + 0.1 & 16 < PSNR_{average} < 28 \\ 0.8 & 28 \leq PSNR_{average} \leq 36 \\ -\frac{1}{80} \times PSNR_{average} + 1.25 & 36 < PSNR_{average} < 60 \\ 0.5 & PSNR_{average} \geq 60 \end{cases} \quad \text{(Equation 4)}$$

where W represents the fluctuation weight 230 of the image frames, and $PSNR_{average}$ represents the average PSNR value of the image frames.

Figure 3:
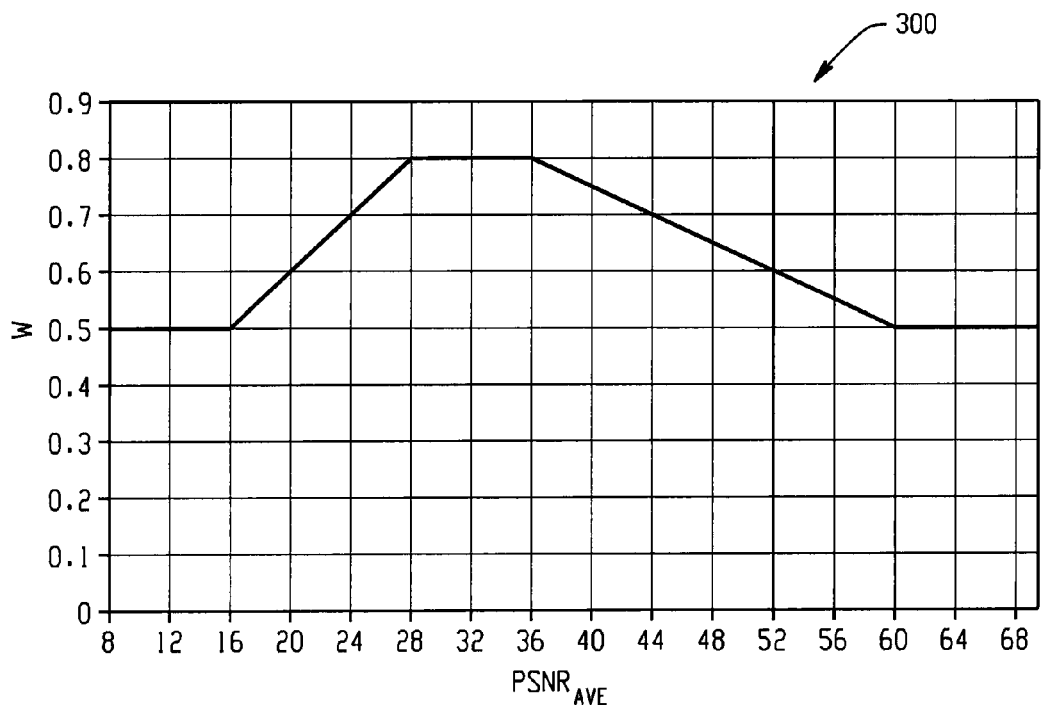
FIG. 3 depicts an example chart showing a fluctuation weight as a function of an average PSNR value of image frames.

FIG. 3 depicts an example chart 300 showing the fluctuation weight 230 as a function of the average PSNR value of the image frames according to Equation 4. For example, certain experiments showed that the fluctuation of the PSNR values of the image frames has a significant impact on human perception of the video quality when the average PSNR value of the image frames is within a range between a lower threshold and an upper threshold, while the fluctuation of the PSNR values of the image frames has less impact when the average PSNR value of the image frames is below the lower threshold or above the upper threshold. As an example, for a video sequence with an average PSNR value below 20, a human observer would consider the video quality unacceptable and the fluctuation of the PSNR values makes little difference. For a video sequence with an average PSNR value beyond 45, the human observer would consider the video sequence having a good video quality, and a little fluctuation of the PSNR values makes little difference. However, the human perception of the video quality is significantly affected by the fluctuation of the PSNR values when the average PSNR value is higher than 20 and lower than 45.

As shown in FIG. 3, the fluctuation weight 230 has a higher magnitude when the average PSNR value is in a predetermined range than that when the average PSNR value is outside of the predetermined range, so that the fluctuation weight 230 can be used to effectively adjust the impact of the quality fluctuation factor 228 on human perception of video quality.

Referring back to FIG. 2, the video quality factor 232 may be determined according to the following equation:

$$P = PSNR_{average} - W \times P_{fluctuation} \quad \text{(Equation 5)}$$

where P represents the video quality factor 232, $PSNR_{average}$ represents the average PSNR value of the image frames, $P_{fluctuation}$ represents the fluctuation factor 228 of the image frames, and W represents the fluctuation weight 230 of the image frames.

Similarly, the video quality factor 232 may be determined using SSIM indices of the image frames in the video sequence 224 according to the following equation:

$$P = SSIM_{average} - W \times P_{fluctuation} \quad \text{(Equation 6)}$$

where P represents the video quality factor, $SSIM_{average}$ represents the average SSIM index of the image frames, $P_{fluctuation}$ represents the fluctuation value of the image frames, and W represents the weight value of the image frames. Both $P_{fluctuation}$ and W are related to the SSIM indices of the image frames.

Figure 4:
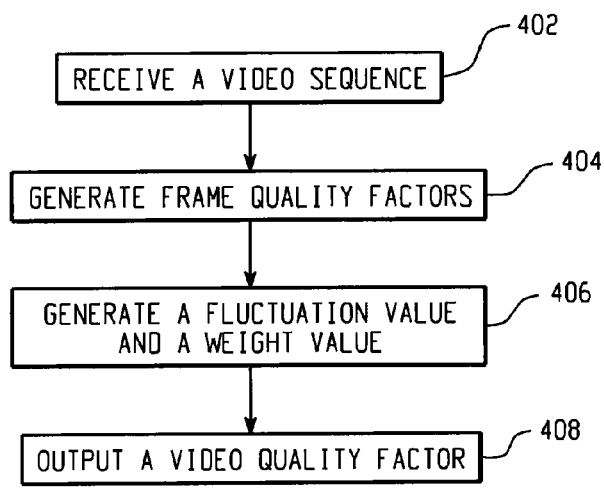
FIG. 4 illustrates an example flow diagram depicting a method for evaluating video quality.

FIG. 4 illustrates an example flow diagram depicting a method for evaluating video quality. At step 402, a video sequence that includes one or more image frames is received for evaluation. Frame quality factors for the image frames are generated at step 404. Then a fluctuation value and a weight value are generated at step 406. A video quality factor is output to indicate the overall quality of the video sequence at step 408.

Figure 5:
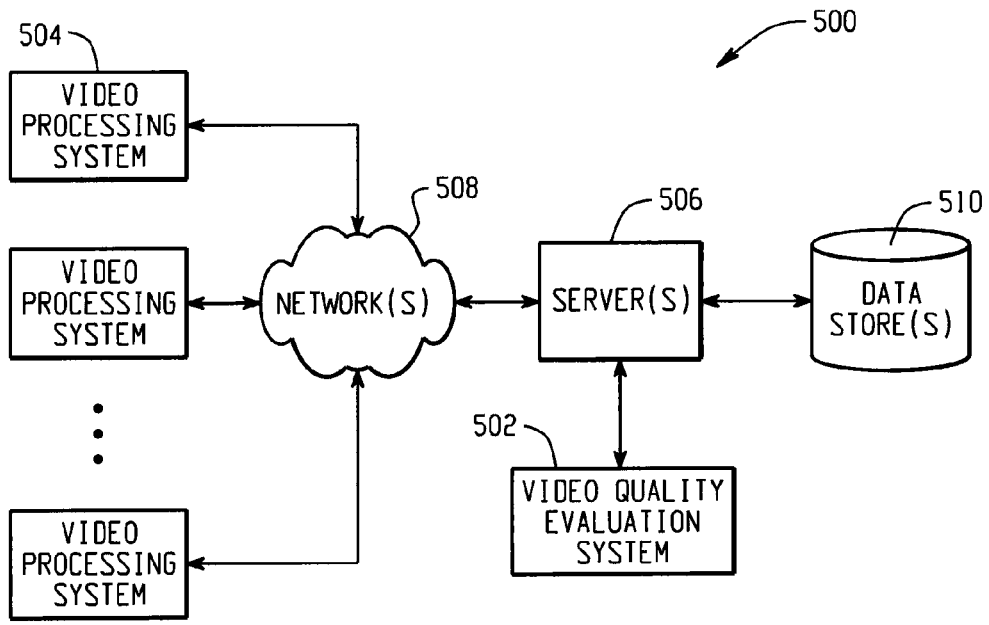
FIG. 5 illustrates a computer-implemented environment wherein a video quality evaluation system hosted on one or more servers evaluates output video quality of one or more video processing systems through a network.

FIG. 5 illustrates a computer-implemented environment wherein a video quality evaluation system 502 hosted on one or more servers 506 evaluates output video quality of one or more video processing systems 504 through a network 508. The one or more servers 506 can contain or have access to one or more data stores 510 for storing data for the video quality evaluation system 502.

Figure 6:
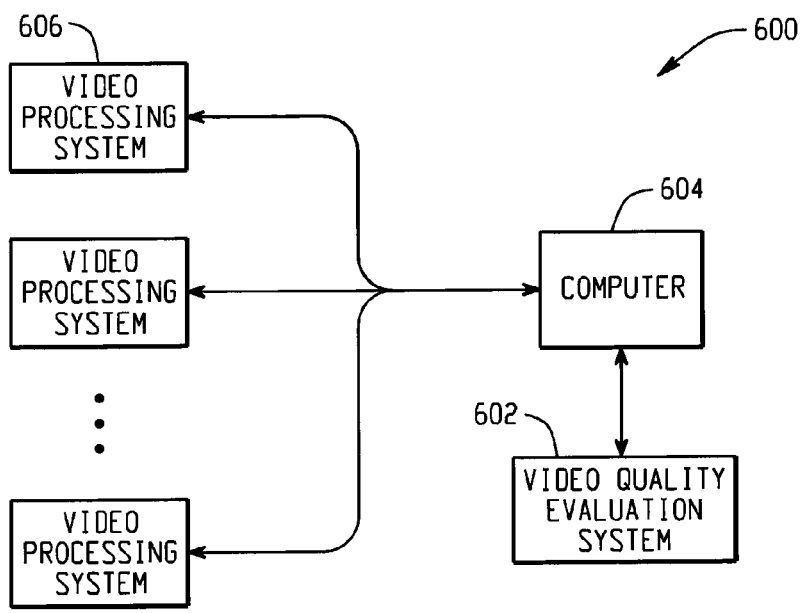
FIG. 6 illustrates an example system where a stand-alone computer system hosts a video quality evaluation system to evaluate output video quality of one or more video processing systems.

FIG. 6 illustrates an example system 600 where a stand-alone computer system 604 hosts a video quality evaluation system 602 to evaluate output video quality of one or more video processing system 606.

This written description uses examples to disclose the invention, include the best mode, and also to enable a person skilled in the art to make and use the invention. The patentable scope of the invention may include other examples that occur to those skilled in the art. For example, systems and methods disclosed herein may be used to improve accuracy and efficiency of automatic quality evaluation of video streams. As an example, systems and methods disclosed herein may be used to improve the quality of video processing systems (e.g., an encoder).

The invention claimed is:

1. A processor-implemented method for evaluating quality of a video sequence, the method comprising:

receiving a video sequence including one or more image frames, the video sequence being associated with a video processing system;

generating, using a data processor, a frame quality factor for each image frame in the video sequence based on a comparison between the image frame and a reference image frame;

generating, using the data processor, a fluctuation value and a weight value for the image frames, the fluctuation value of the image frames indicating a variation of the frame quality factors of the image frames, the weight value of the image frames being determined based on an average of the frame quality factors of the image frames; and outputting, using the data processor, a video quality factor based on the frame quality factors of the image frames, the fluctuation value of the image frames, and the weight value of the image frames.

2. The method of claim 1, wherein the video quality factor is used for adjusting parameters of the video processing system if the video quality factor is lower than a threshold associated with the video processing system.

3. The method of claim 1, wherein a frame quality factor of an image frame includes a peak signal-to-noise ratio (PSNR) value of the image frame that is determined according to the following equation:

$$PSNR = 10 \times \log_{10} \frac{MaxErr^2 \times w \times h}{\sum_{i=0,j=0}^{w,h}(x_{ij} - y_{ij})^2}$$

where $x_{ij}$ represents a pixel value of a location (i, j) in the image frame, $y_{ij}$ represents a pixel value of the location (i, j) in a reference frame, MaxErr represents a maximum difference of pixel values between the image frame and the reference frame, w represents a width of the image frame, and h represents a height of the image frame.

4. The method of claim 3, wherein the average of the frame quality factors of the image frames is represented by an average PSNR value of the image frames.

5. The method of claim 4, wherein the average PSNR value of the image frames is determined according to the following equation:

$$PSNR_{average} = \frac{1}{N} \times \sum_{n=0}^{N} PSNR_n$$

where $PSNR_n$ represents a PSNR value of an image frame contained in the video sequence and N represents the number of image frames contained in the video sequence.

6. The method of claim 4, wherein the weight value of the image frames is determined based on the average PSNR value of the image frames.

7. The method of claim 6, wherein the weight value of the image frames is determined according to the following equations:

$$W = \begin{cases} 0.5 & PSNR_{average} \leq 16 \\ \frac{1}{40} \times PSNR_{average} + 0.1 & 16 < PSNR_{average} < 28 \\ 0.8 & 28 \leq PSNR_{average} \leq 36 \\ -\frac{1}{80} \times PSNR_{average} + 1.25 & 36 < PSNR_{average} < 60 \\ 0.5 & PSNR_{average} \geq 60 \end{cases}$$

where W represents the weight value of the image frames, and $PSNR_{average}$ represents the average PSNR value of the image frames.

8. The method of claim 4, wherein the fluctuation value of the image frames is determined according to the following equation:

$$P_{fluctuation} = \sqrt{\frac{\sum_{i=0}^{N}(PSNR_i - PSNR_{average})^2}{N}}$$

where $PSNR_{average}$ represents the average PSNR value of the image frames, $PSNR_i$ represents a PSNR value of an image frame, and N represents the number of image frames contained in the video sequence.

9. The method of claim 4, wherein the video quality factor is determined according to the following equation:

$P = PSNR_{average} - W \times P_{fluctuation}$ where P represents the video quality factor, $PSNR_{average}$ represents the average PSNR value of the image frames, $P_{fluctuation}$ represents the fluctuation value of the image frames, and W represents the weight value of the image frames.

10. The method of claim 1, wherein the frame quality factor for an image frame includes a structural-similarity-based image quality assessment (SSIM) index of the image frame.

11. The method of claim 10, wherein the average of the frame quality factors of the image frames is represented by an average SSIM index of the image frames.

12. The method of claim 11, wherein the video quality factor is determined according to the following equation:

$P = SSIM_{average} - W \times F_{fluctuation}$ where P represents the video quality factor, $SSIM_{average}$ represents the average SSIM index of the image frames, $P_{fluctuation}$ represents the fluctuation value of the image frames, and W represents the weight value of the image frames;
wherein $P_{fluctuation}$ is related to SSIM indices of the image frames; and
wherein W is related to the SSIM indices of the image frames.

13. A system for evaluating quality of a video sequence, said system comprising:
one or more data processors;
a computer-readable storage medium encoded with instructions for commanding the one or more data processors to execute steps including:
receiving a video sequence including one or more image frames, the video sequence being associated with a video processing system;
generating a frame quality factor for each image frame in the video sequence based on a comparison between the image frame and a reference image frame;
generating a fluctuation value and a weight value of the image frames, the fluctuation value of the image frames indicating a variation of the frame quality factors of the image frames, the weight value of the image frames being determined based on an average of the frame quality factors of the image frames; and
outputting a video quality factor based on the frame quality factors of the image frames, the fluctuation value of the image frames, and the weight value of the image frames.

14. The system of claim 13, wherein a frame quality factor of an image frame includes a peak signal-to-noise ratio (PSNR) value of the image frame.

15. The system of claim 14, wherein the average of the frame quality factors of the image frames is represented by an average PSNR value of the image frames.

16. The system of claim 15, wherein the video quality factor is determined according to the following equation:

$P = PSNR_{average} - W \times P_{fluctuation}$ where P represents the video quality factor, $PSNR_{average}$ represents the average PSNR value of the image frames, $P_{fluctuation}$ represents the fluctuation value of the image frames, and W represents the weight value of the image frames.

17. The system of claim 13, wherein the frame quality factor for an image frame includes a structural-similarity-based image quality assessment (SSIM) index of the image frame.

18. The system of claim 17, wherein the average of the frame quality factors of the image frames is represented by an average SSIM index of the image frames, and the video quality factor is determined according to the following equation:

$P = SSIM_{average} - W \times P_{fluctuation}$ where P represents the video quality factor, $SSIM_{average}$ represents the average SSIM index of the image frames, $P_{fluctuation}$ represents the fluctuation value of the image frames, and W represents the weight value of the image frames;
wherein $P_{fluctuation}$ is related to SSIM indices of the image frames; and
wherein W is related to the SSIM indices of the image frames.

19. The system of claim 13, wherein the video quality factor is used for adjusting parameters of the video processing system if the video quality factor is lower than a threshold associated with the video processing system.

20. A non-transitory computer-readable storage medium comprising programming instructions for evaluating quality of a video sequence, the programming instructions being adapted to cause a processing system to execute steps comprising:
receiving a video sequence including one or more image frames, the video sequence being associated with a video processing system;
generating a frame quality factor for each image frame in the video sequence based on a comparison between the image frame and a reference image frame;
generating a fluctuation value and a weight value of the image frames, the fluctuation value of the image frames indicating a variation of the frame quality factors of the image frames, the weight value of the image frames being determined based on an average of the frame quality factors of the image frames; and
outputting a video quality factor based on the frame quality factors of the image frames, the fluctuation value of the image frames, and the weight value of the image frames.

* * * * *